M. VAN METER.
WHEEL HUB.
APPLICATION FILED JULY 7, 1920.

1,417,119. Patented May 23, 1922.

Witness
A. J. Stenner

Inventor
Morton Van Meter

By Charles E. Wiser
Attorney

UNITED STATES PATENT OFFICE.

MORTON VAN METER, OF CADILLAC, MICHIGAN, ASSIGNOR TO SIMPLEX WIRE WHEEL COMPANY, OF CADILLAC, MICHIGAN, A CORPORATION OF MICHIGAN.

WHEEL HUB.

1,417,119.　　　　　Specification of Letters Patent.　　Patented May 23, 1922.

Application filed July 7, 1920. Serial No. 394,431.

*To all whom it may concern:*

Be it known that I, MORTON VAN METER, a citizen of the United States, residing at Cadillac, county of Wexford, State of Michigan, have invented a certain new and useful Improvement in Wheel Hubs, and declare the following to be a full, clear, and exact description of the same, such as will enable others skilled in the art to which it pertains to make and use the same, reference being had to the accompanying drawings, which form a part of this specification.

This invention relates to hub construction for demountable wheels and the object of the invention is to provide a simple and efficient means for detachably securing a wheel in place on an inner hub member mounted on the axle of a vehicle and to lock the same from movement relative thereto. A novel feature of the invention is involved in the means for locking the inner hub and outer hub members together whereby they are firmly held from accidental displacement and may be quickly and readily dismounted. A further object of the invention is involved in the construction of the two part cap, one part having threaded relation with the inner hub member and being provided with flat springs adapted to engage in the serrated face of the retainer, the other part of the hub cap being limited in rotation in relation to the first named part, rotation of the same in counter clock-wise direction withdrawing the springs from the serrated face of the retainer. A particular object of this invention is to provide a wheel hub of the character described adapted to be mounted or demounted by turning of the hub cap by means of a wrench applied thereto and which is normally automatically locked from removal and is unlocked by manual rotation of the cap. The use of additional mechanism or devices requiring separate operation for locking and unlocking the hub cap is thus avoided. These objects and the several novel features of the invention are hereinafter more fully described and claimed and the preferred form of construction by which these objects are attained is shown in the accompanying drawings in which—

Figure 1:
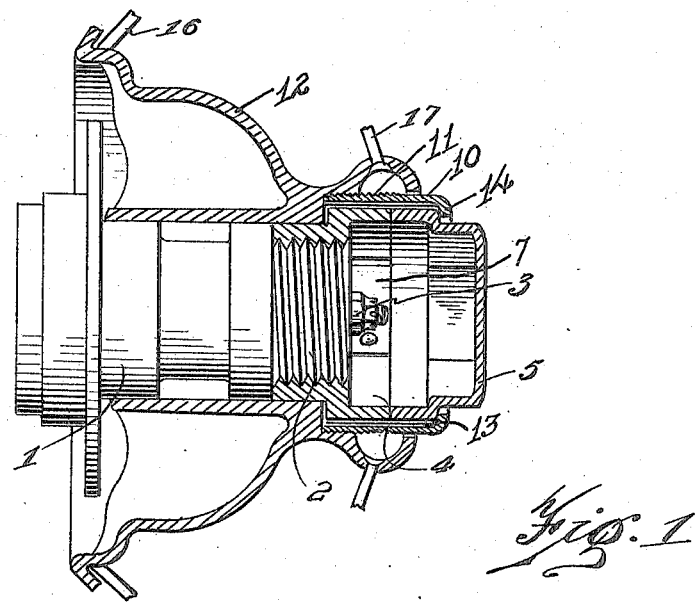
Fig. 1 is a section through a wheel hub embodying my invention.
Figures 2, 3:
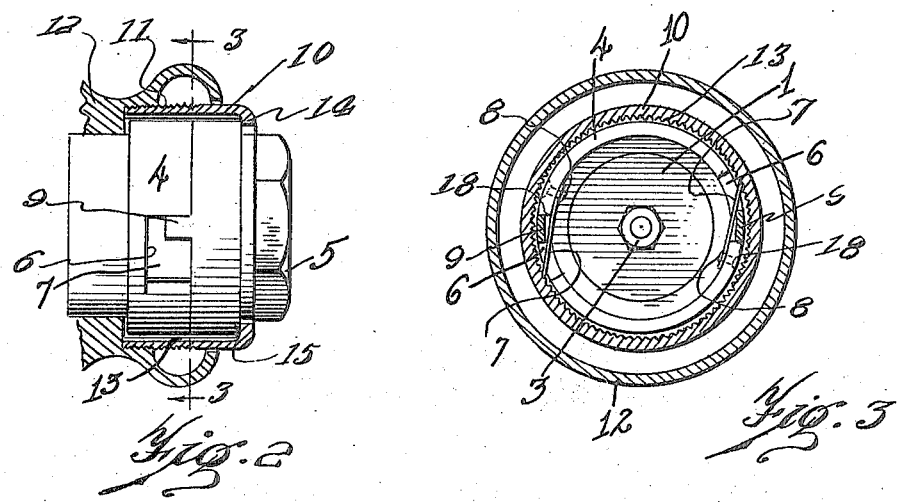
Fig. 2 is a section through the outer hub and retainer showing the inner and outer cap parts in elevation.
Fig. 3 is a section through the hub taken on line 3—3 of Fig. 2.

An inner hub member 1 of the usual type is provided which is threaded at one end as indicated at 2 the said threads being right hand threads and the inner hub member 1 is secured to the axle end by the nut 3 as shown. The hub cap is formed of two parts, an inner part 4 which is adapted for threaded relation with the right hand threads 2 and an outer part 5, the outer end of which is hexagonal in shape and adapted for the application of a hub wrench having a hexagonal aperture. As shown in Fig. 2 the inner hub cap is notched at 6 two such notches being preferably provided and as shown more particularly in Fig. 3 a pair of springs 7 are secured to the inner hub cap 4 at 8. The outer hub cap 5 is provided with a pair of lugs 9 as shown more particularly in Figs. 2 and 3, which engage in the notches 6 when the cap members are assembled. Surrounding the cap members and adapted to hold the same in the proper position when assembled is a retainer 10 provided with left hand threads 11 adapted to be threaded into the outer hub member 12 as shown in Figs. 1 and 2. The retainer 10 is provided with serrations 13 throughout the inner face thereof and is provided with an internal flange 14 adapted to engage the shoulder 15 of the outer hub cap 5. The outer hub member is ornamental in form and provides a support for the inner ends of the spokes 16 and 17 of the wheel. As will be noted from Fig. 3 the ends of the flat spring 7 are adapted to engage in the serrations 13 in the retainer 10.

In operation it is first necessary to assemble the device it being first necessary to position the two cap members in proper relation, as shown in Fig. 2, at which time the retainer 10 may be slipped thereover and threaded into the outer hub member 12 with the two cap members. By application of a wrench to the outer hub cap 5 the said hub cap may be turned in a clockwise direction, the lugs 9 of the outer cap engaging the shoulders 18 of the notches 6 and thereby rotating the inner cap member and threading the same onto the threads 2 of the inner hub member. When the inner cap part has been threaded onto the threads 2 as far as possible the wrench may be removed, the inner cap part being locked to the outer hub member by engagement of the ends of the flat springs 7 in the serrations 13 in the retainer which is secured to the outer hub member by the left hand threads 11. When it becomes necessary to remove the outer hub member the wrench may be again applied to the outer cap part 5 and rotated in a counter clock-wise direction thereby moving the lugs 9 on the outer cap member in a counter clock-wise direction, as will be understood from Fig. 3, and retracting the ends of the springs 7 from the serrations 13 on the retainer 10 at which time by continued counter clock-wise rotation of the outer cap part 5 the inner cap part 4 is unthreaded from the threads 2 and the outer hub member withdrawn from the inner hub member.

From the foregoing description it becomes evident that the device is very simple and efficient in operation and provides an automatic means for locking the inner and outer hub members of a wheel together, the locking and unlocking of the hub members being performed by the normal operation of the wrench, the hub members being locked together at any point upon cessation of rotation of the hub cap, the same lock locking the entire wheel to the inner hub member and providing a construction that effectively accomplishes the objects desired.

Having thus fully described my invention, its utility and mode of operation, what I claim and desire to secure by Letters Patent of the United States is—

1. The combination of an inner hub member, an outer hub member, the inner hub member having terminal right hand screw threads, a two part cap therefor comprising an inner and an outer cap part revolubly mounted within the outer hub member, the inner cap part having threads for engaging the threaded end of the inner hub member and being also provided with a pair of rectangular notches, a flat spring secured to the inner cap part adjacent each notch and extending therethrough, the outer cap part being provided with a pair of lugs adapted to engage in the said notches when assembled and a left-hand threaded retainer in threaded relation with the outer hub member having a series of serrations on the inner face thereof in which the spring ends engage, the retainer being also provided with a flange engaging over the outer cap member.

2. The combination of an inner hub member, an outer hub member, the inner hub member having terminal right hand screw threads, a two part cap therefor revolubly mounted within the outer hub member consisting of an inner cap part and an outer cap part, the inner cap part being provided with threads for engaging the threaded end of the inner hub member, a cap retainer provided with left hand threads threaded into the outer hub member and provided with serrations on the inner face thereof, a pair of flat springs carried by the inner cap part adapted to engage in the serrations and means on the outer cap part for withdrawing the springs from the said serrations.

3. The combination of an inner hub member, an outer hub member, the inner hub member having terminal right hand screw threads, a two part cap therefor revolubly mounted within the outer hub member consisting of an inner and an outer cap part, the inner cap part being provided with threads for engaging the threaded end of the inner hub member, a retainer fitting about the inner and outer cap parts provided with a series of serrations on the inner face thereof and being left-hand threaded to engage in similar threads in the outer hub member, a flange on the retainer and a shoulder on the outer cap part engaged by the said flange, the outer cap part being provided with an hexagonal protuberance adapted for the application of a wrench, a series of flat springs secured to the inner cap part and adapted to engage the serrations on the retainer, and means on the outer cap part for withdrawing the spring ends from the said serrations.

4. The combination of an inner hub member, an outer hub member, the inner hub member having terminal right hand screw threads, a two part cap therefor revolubly mounted within the outer hub member consisting of an inner cap part, and an outer cap part, a retainer holding the cap parts in assembled relation, the retainer being provided with serrations on the inner face thereof, spring ratchet devices carried by the inner cap part adapted to engage the said serrations and means on the outer cap part for withdrawing the ratchet devices from the said serrations.

5. The combination of an inner hub member, an outer hub member, the inner hub member having terminal right hand screw threads, a cap formed of an inner and outer part adapted for limited relative rotation revolubly mounted within the outer hub member, the inner cap part being provided with threads for engaging the threaded end of the inner hub member, a cap retainer provided with left hand threads threaded into the outer hub member and provided with serrations on the inner face thereof, a pair of notches in the inner cap part, a pair of springs extending tangentially from the inner cap part through the notches therein and engaging the said serrations in the retainer, a pair of lugs on the outer cap part engaging in the notches in the inner cap part, rotation of the outer cap part first withdrawing the springs from the serrations and then withdrawing the inner cap part from the inner hub member.

6. The combination of an inner hub member having terminal screw threads, an outer hub member having a portion extending outwardly beyond the threaded end of the inner hub member, a cap having a threaded end to engage the inner hub member, a retainer therefor in the outer end of the outer hub member in left hand threaded relation therewith, said retainer having notches formed circumferentially of the inner face, a flat spring member secured to the cap extending tangentially through the cap to engage the notches of the retainer, and means for turning the cap, said means including means for first withdrawing the spring from engagement with the notches.

7. In combination with an inner hub having right hand terminal screw threads, an outer hub adapted to be moved longitudinally into and out of keyed relation with the inner hub, a cap member for moving the outer hub in either direction, said cap member having right hand screw threads for engaging the inner hub, and being rotatively secured in the outer hub, a series of tangential flat spring members on the cap, there being a series of notches provided in a part in fixed relation with the outer hub member with which the springs engage to prevent rotation of the cap to withdraw the same from the inner hub, and means engaging the springs whereby on turning the cap for withdrawal the springs are first retracted from the serrations.

In testimony whereof, I sign this specification.

MORTON VAN METER.